W. M. BLEAKLEY.
Improvement in Lard and Butter Cutters.
No. 129,921.  Patented July 30, 1872.
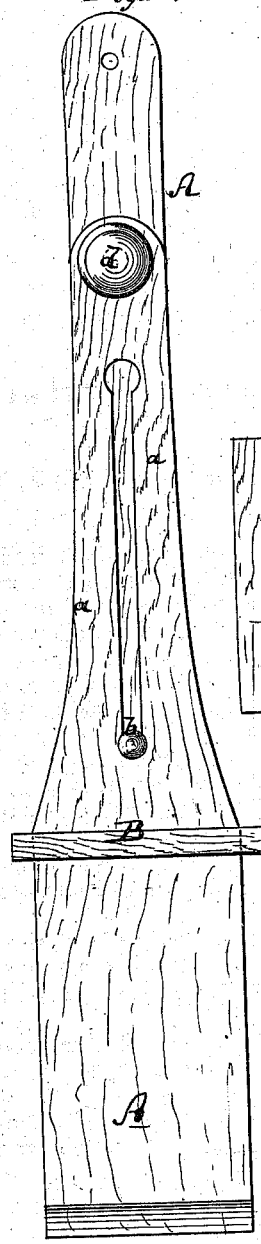
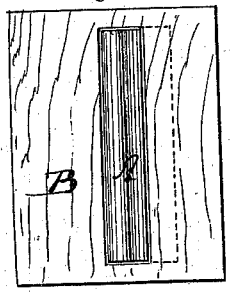
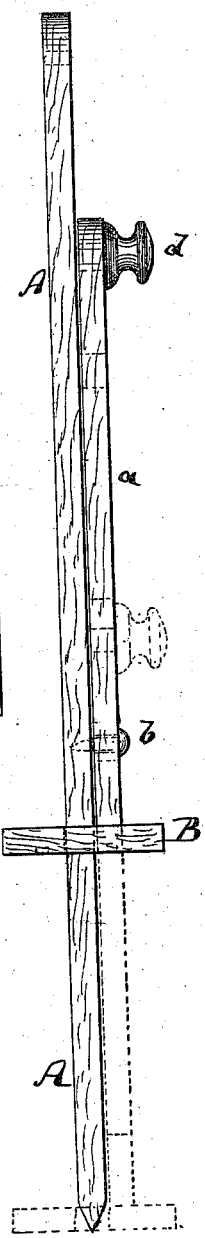
Witnesses:
P. C. Dieterich
C. Sedgwick
Inventor:
W. M. Bleakley
per ___
Attorneys.

UNITED STATES PATENT OFFICE.

WILLIAM M. BLEAKLEY, OF VERPLANCK, NEW YORK.

IMPROVEMENT IN LARD AND BUTTER CUTTERS.

Specification forming part of Letters Patent No. 129,921, dated July 30, 1872.

Specification describing a new and Improved Stick for Transferring Lard and other substances, invented by WILLIAM M. BLEAKLEY, of Verplanck, in the county of Westchester and State of New York.

Figure 1 represents a face view, Fig. 2 an edge view, and Fig. 3 an end view of my improved lard-stick.

Similar letters of reference indicate corresponding parts.

This invention relates to a new self-cleaning stick for transferring lard, butter, tallow, tar, or other viscid or semi-liquid substance from one vessel to another. The invention consists in providing such stick with a slide, whereby it can be cleared without soiling the fingers of the person handling it.

A in the drawing represents the stick, of suitable form and size. B is a slotted plate embracing the lower part of the stick, and provided with a slotted shank, $a$, which is by a pin, $b$, held to the handle part of the stick. By means of a knob, $d$, or equivalent projection the shank can be moved to draw the plate B up or down along the stick. Thus, when the stick is used to dip into lard or other substance and transfer it from one place or vessel to another, the slide B is drawn up, as in Figs. 1 and 2; but when the lard or other substance is to be detached from the stick the plate B is slid down to the lower end of the stick, into the position shown by dotted lines in Fig. 2, thereby entirely cleaning the stick on all sides. Instead of having the shank $a$ slotted and the pin $b$ on the stick, the latter may be slotted and the pin on the shank; or any other connection or guide may be substituted in place of the pin and of the slot. By enlarging the slot at the upper end, as shown in Fig. 1, it can be drawn over the pin-head when the slide is down, thus allowing the complete detachment of the slide from the stick whenever desired.

The shape and size of the stick can be varied at pleasure, the opening in the plate B depending on the cross-section of the stick for its shape.

Having thus described my invention, I claim as new and desire to secure by Letters Patent—

The stick A provided with the cleaning-slide B, substantially as herein shown and described.

WILLIAM M. BLEAKLEY.

Witnesses:
CYRUS TRAVIS,
CHARLES E. OMEL.